United States Patent [19]

Strasser

[11] Patent Number: 4,726,531

[45] Date of Patent: Feb. 23, 1988

[54] MECHANISM FOR THE COMMINUTION OF GRINDING OF BRITTLE GRINDING STOCK

[75] Inventor: Siegfried Strasser, Much, Fed. Rep. of Germany

[73] Assignee: Klöckner-Humboldt-Deutz Aktiengesellschaft, Fed. Rep. of Germany

[21] Appl. No.: 832,656

[22] Filed: Feb. 25, 1986

[30] Foreign Application Priority Data

Feb. 23, 1985 [DE] Fed. Rep. of Germany ....... 3506486

[51] Int. Cl.⁴ .................. B02C 17/02; B02C 17/18
[52] U.S. Cl. ........................... 241/19; 241/24; 241/29; 241/70; 241/78; 241/79; 241/79.3; 241/80; 241/152 A; 241/171
[58] Field of Search .................. 241/18, 19, 24, 29, 241/70, 71, 72, 76, 78, 79, 79.2, 79.3, 80, 152 R, 152 A, 153, 171

[56] References Cited

U.S. PATENT DOCUMENTS

| | | | |
|---|---|---|---|
| 1,902,413 | 3/1933 | Miller | 241/70 X |
| 3,949,940 | 4/1976 | Horning | 241/70 X |
| 4,369,926 | 1/1983 | Rasmussen et al. | 241/72 X |

FOREIGN PATENT DOCUMENTS

| | | | |
|---|---|---|---|
| 741843 | 5/1943 | Fed. Rep. of Germany | 241/77 |
| 45-7980 | 3/1970 | Japan | 241/79.3 |

*Primary Examiner*—Timothy V. Eley
*Attorney, Agent, or Firm*—Hill, Van Santen, Steadman & Simpson

[57] ABSTRACT

A mechanism and method for the comminuting and grinding of brittle grinding stock including a roll press with the material passed from the roll press to a deagglomeration drum which co-rotates with the tube mill. The material from the deagglomeration drum is passed to the tube mill and the material from the tube mill being passed to a separator. In one form the material from the separator is passed to a second separator and the coarser products from the second separator are led back to the tube mill with an airstream conducting the finer material from the tube mill to the first separator.

15 Claims, 2 Drawing Figures

MECHANISM FOR THE COMMINUTION OF GRINDING OF BRITTLE GRINDING STOCK

BACKGROUND OF THE INVENTION

The invention relates to improvements in a mechanism for the comminution and grinding of brittle grinding stock such as cement clinker, or, coal or the like with equipment including a high pressure roll press, a tube mill, a deagglomeration chamber and at least one separator with the mechanisms operated and connected in an improved operational manner to reduce the energy consumption and improve the grinding and comminution abilities.

Efforts have been made to increase the very low energy utilization in comminution machines, particularly in tube mills or ball mills. For example, a two-stage facility for the comminution and grinding of brittle stock such as cement clinker that has not been pre-comminuted is known in EP Patent Application No. 0 084 383 wherein the grinding stock is first pressed under relatively high pressures in a first stage in the nip of a two-roll press leading in part to particle destruction and in part to the creation of incipient cracks in the particle interior. This results in the formation of agglomerates which are then deagglomerated in a second stage in a tube mill or ball mill with a comparatively low energy outlay and are then ground to finished product fineness.

The roll press is operated with a high pressing power, and more particularly, using more than 2 t/cm of roller length which produces agglomerates or scabs in the materials, the grindability of which is considerably improved in comparison to unpressed material so that the two-stage comminution leads to a noticeable reduction of energy requirement. As a consequence of the high pressing power of the roll press, for example, when pressing cement clinker granules, the agglomerates that are formed comprise a relatively high proportion of particles which have been already reduced to the desired cement fineness which is about 30% smaller than 90 $\mu$m. These portions need not be further comminuted, but load the tube mill in the finished grinding of the agglomerates which is being done.

It is an object of the invention to utilize the concept of two-stage comminution and grinding but to modify the procedure and apparatus without the substantial outlay of additional apparatus expense and to obtain a saving in the specific energy requirements by relieving the tube mill of having to again process the discharged material of the roll press which has been already ground to the desired fineness of the finished product.

A further object of the invention is to provide means for deagglomerating the materials which are discharged from the roll press in a two-stage mechanism of the type described with the deagglomeration aiding in operation of the ball mill, increasing its capacity, and overall obtaining a uniform well comminuted material with a minimum of energy expenditure.

In accordance with the principles of the invention, the discharge material of the roll press is not supplied directly to the tube mill before or after deagglomeration. The material from the roll press is first supplied to a separator which may be a sifter or a cyclone type separator which separates the existing portion of the material out of the deagglomerated material which has already been ground fine enough to be complete. Only the coarse materials, that is, the grits of the separator are directed to the tube mill which is filled with the grinding bodies. The coarse material may be passed directly from the first separator to the tube mill or may be passed to a second separator which further separates completely fine material. For deagglomeration or breaking up of the discharged material from the roll press, there is provided a deagglomeration drum which receives the material and tumbles it to break it up. The deagglomeration drum co-rotates with the tube mill and is in communication with and located at the materials outlet of the tube mill. The materials inlet for the deagglomeration drum is in communication with the discharge of the roll press and the materials outlet of the deagglomeration drum communicates with the separator.

In accordance with the invention, the two stage comminution and grinding includes a rotary tube having two chambers in communication with each other with the one chamber having no grinding bodies therein and providing the deagglomeration chamber. The other chamber essentially operates as a ball mill and has grinding bodies therein forming the tube mill. The materials discharge conduit of the high pressure roll mill discharges into the end face of the rotary tube of the deagglomeration drum and the material as it breaks up, is passed to the separator. The separator then separates out the material which has been ground to a fineness meeting the standard required and passes it to a container for completed ground material, and the more coarse material is then passed to the tube mill. The tube mill conveniently discharges directly into the deagglomeration drum and the ground material passes up to the separator. Because the material which has been reduced to sufficient fineness in the roll press is separated, it does not have to be passed through the ball mill, thus reducing the quantity of material having to be processed in the ball mill. This effects an appreciable reduction of power consumption of the rotary tube mill. It also increases the effectiveness of the tube mill inasmuch as it is supplied only with material which requires grinding.

As set forth, the material discharges of the deagglomeration mill and tube mill come together and are collected by a common materials fall out housing which is stationary and in a preferred form, surrounds the tube mill and deagglomeration drum. The construction of the housing is such that it has openings for the passage of the deagglomerated material and of the ground material and an airstream is provided passing from the tube mill. This airstream, in a preferred form, is utilized for carrying the fine material from the out fall housing to the separator. In some forms of material, the airstream may be utilized to carry the entire discharge of material, and in other forms, separation may be effected so that the airstream carries only the fine material and the heavier material is physically carried, such as by a bucket elevator.

In a preferred arrangement, the upper region of the materials out fall housing is connected to a sifter which may take the form of a gravity air separator. The fine grained fraction of the deagglomeration drum will be entrained in the airstream to be carried up to the separator. The out fall housing may have a conduit connected to the lower region to receive the more coarse material which is then carried by a bucket elevator to be carried to the separator. In this arrangement, the finer portions of material discharged from the deagglomeration mill are conveyed in a pneumatic fashion to the separator and the coarser materials are conveyed mechanically.

The sifting or separation of the fine materials from the more coarse materials in the deagglomeration mill can be accomplished by a static sifter such as a gravity air separator which has no rotating parts or by a dynamic sifter such as a cyclone air separator.

Other objects, advantages and features will become more apparent with the teaching of the principles of the invention in connection with the disclosure of the preferred embodiments thereof in the specification, claims, and drawings in which:

DESCRIPTION OF THE PREFERRED EMBODIMENTS

Figure 1:
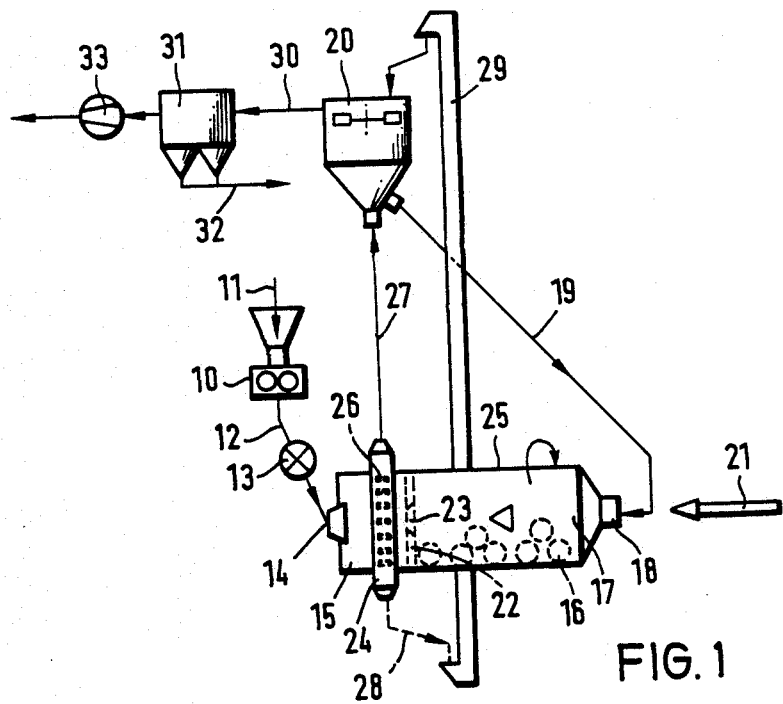
FIG. 1 is a schematic or diagrammatic view of a preferred embodiment of a two-stage grinder constructed and operating in accordance with the principles of the present invention.

In the arrangement illustrated in FIG. 1, the first stage of the two-stage comminution and grinding structure of the invention includes a high pressure roll press 10 shown somewhat schematically with opposed grinding rolls. Charging stock 11 is directed to the press to be comminuted. For example, this may be cement clinker which has not been precomminuted and is delivered with a grain size, for example, up to 100 mm. The grain size of a significant part of the charging stock 11 is greater than the width of the narrowest nip formed between the rolls of the press 10, for example, 20 mm between the two press rollers. The rollers have a diameter, for example, of 900 mm. The pressing power of the rollers of the roll press 10 acting on the stock 11 amounts to more than 2 t/cm of roller length, for example, 6 through 8.6 t/cm. The charging stock is comminuted in the nip between the rollers by means of a combined unit grain comminution and materials bed comminution. For the implementation of the latter comminuting principle, the charging stock to be comminuted is supplied to the nip of the press 10 in a large quantity via a vertical stack arranged above the nip such that the stock to be comminuted is drawn in between the rollers and presses the rollers apart and the particles of the charging stock mutually crush one another in the nip. The cement clinker emerges from the nip of the roll press comminuted and partially agglomerated. That is, it is pressed into scabs 12 which are then supplied via a control 13 to the materials admission connection of a deagglomeration drum 15. The scabs 12 are of a nature such as that they can be crumbled by hand and they are disintegrated in the drum 15 by being tumbled therein. The drum, as will be explained later herein, is co-rotatable or co-movable with the ball mill so that its continual motion is assured and is accomplished with a common drive with the ball mill.

In the deagglomeration drum 15, the proportion of particles already reduced to the desired fineness such as for grinding cement, would be relatively high, on the order of about 30%, that is, 30% having a fineness of less than 90 μm.

A tube mill 17 is provided which is filled with grinding bodies 16 such as balls. This is integrated with the deagglomeration drum 15 to form a rotary tube. The tube mill 17 is fed with material from the coarse or grits return conduit 19 of a separator 30. While other forms of separators may be employed, a dynamic separator in the form of a cyclone is illustrated schematically.

The material fed into the tube mill 17 is carried in with a conveying airstream shown schematically by the arrowed line 21 provided by a suitable compressor or blower. The airstream is discharged into an opening in the end face of the rotary tube mill 17 through a central admission opening 18 through which the coarse material is supplied from the line 19.

Conveniently the deagglomeration drum 15 and the tube mill 17 may be formed of a single tubular body 25 and a separation wall 22 extends radially through the center of the tube 25 and is provided with openings 23 through which the ground material passes. The wall 22 also retains the grinding balls 16 in the tube mill end so that the deagglomeration chamber 15 is kept free of grinding balls. The tube 25 is driven in rotation and in vibration by a common drive shown schematically by the curved arrowed line so that a common drive operates both the deagglomeration chamber 15 and the tube mill 17 for comovement. As movement continues, the conveying airstream carries the finely ground material out of the tube mill into the deagglomeration chamber 15 and out through an enclosing housing 24, with at least one opening 23 being provided in the wall between the tube mill and the deagglomeration chamber 15.

A materials discharge opening is provided in the deagglomeration drum 15 and the tube mill openings 23 may discharge to an opening, not shown, for the tube mill or the tube mill may discharge directly into the deagglomeration chamber 15. Nevertheless, the discharge of the tube mill 17 and the discharge of the deagglomeration chamber 15 are received by a common out fall housing 24 which is stationary and which surrounds the tube 25 to receive the material. As shown somewhat schematically, the tube 25 may have openings 26 for the passage of both deagglomerated material and ground material to pass into the out fall housing 24. The out fall housing 24 is connected at its upper region to the separator 20 by means of an upwardly extending conduit 27. This conduit 27 pneumatically carries the deagglomerated material as well as the ground product of the tube mill 17, the pneumatic conveying means being provided by the flow of air provided by the source 21.

The lower region of the materials out fall housing 24 may be provided with a product out fall conduit 28 which leads to a mechanical conveyor such as a bucket conveyor 29. The bucket conveyor mechanically conveys the coarser grained fraction of the product which is discharged from the materials out fall housing 24, up to the separator 20.

It is contemplated that the conveying airstream 21 may not be continually present and there then can be the possibility of conveying all of the products emerging from the out fall housing 24 up to the separator via the bucket elevator 29.

Conversely, in some instances the airstream 21 may act as a penumatic conveyor for carrying all of the products up to the separator 20. If this is contemplated, the bucket elevator 29 may be omitted for pneumatic conveyance of all of the materials through the conduit 27.

In the separator 20, the completed fine grained fraction is withdrawn via conduit 30. This material may be passed through a dust separator 31 such as an electrostatic dust separator. The fine finished product 32 such as cement ground to adequate fineness is withdrawn at 32. An induced draft or suction blower may be provided at 33.

In accordance with the structure and method described above, a considerable energy saving is achieved for the comminution and grinding of brittle material such as cement clinker because the tube mill 17 is relieved of having to handle a portion of the materials discharged from the roll press which materials already have the desired fineness of the finished product.

Figure 2:
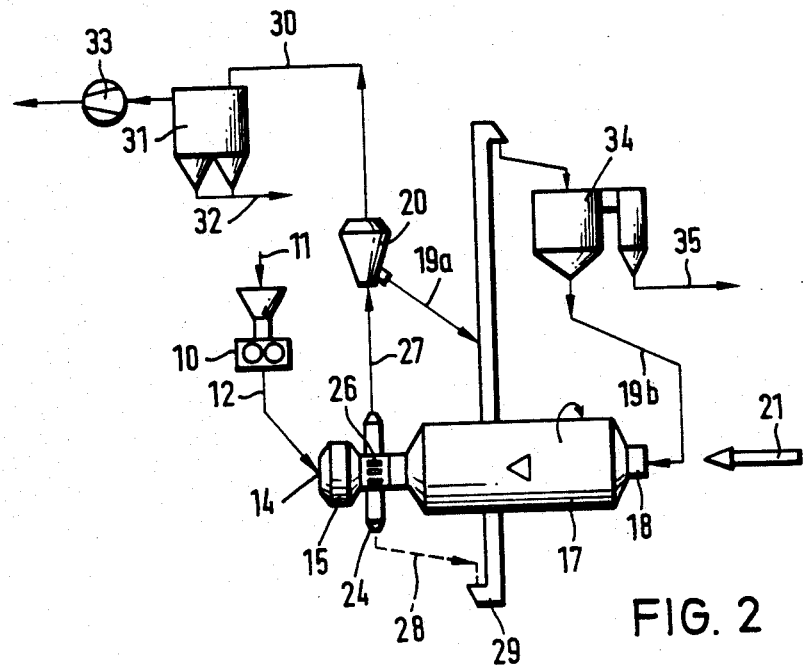
FIG. 2 is another schematic or diagrammatic view shown in somewhat flow-sheet arrangement illustrating a further embodiment which essentially constitutes a modification of the arrangement of FIG. 1, but employs the principles of the invention.

In the embodiment of FIG. 2 which constitutes a modification of the arrangement of FIG. 1, similar parts bear similar numbers and in FIG. 2, a coarse material or grits discharge from the separator 20, is shown at 19a. As stated above, 20 may be a cyclone or a static sifter or similar separator. The bucket conveyor 29 which is connected to the discharge 28 of the out fall housing is connected to convey the materials to a second separator 34. This second separator is illustrated in the form of a cyclone air separator and a coarse material discharge conduit 19b from the second separator 34 leads to the inlet of the ball mill 17. The separator 34 lifts additional fine finished product and passes it out through a finished product discharge 35 which will be merged with the finished product discharge 32 of the system.

In the arrangement of FIGS. 1 and 2, a stream of hot gas may be employed for the conveying airstream 21 so that the hot gas provides a dryer system concurrent with the grinder system provided by the mechanism. For this purpose, a heater will be employed in connection with the air supply 21. Overall, a further performance enhancement and a reduction of the energy outlay in the grinding of brittle grinding stock has been accomplished.

The deagglomeration drum 15 can be constructed so that it can be decoupled from the tube mill 17 and if desired, may be equipped with its own drive arrangement. In such arrangement, the drum 15 and the tube mill can be driven at different speeds which may be controllably varied to comply with the respective requirements. When the charging stock 11 delivered to the mechanism is hot, such as hot cement clinker, the deagglomeration drum 15 can act as a cooling drum. When the conveying airstream delivered through the system and passing upwardly through the conduit 27 is hot, this can be cooled by indirect gas cooling to reduce the structural volume required by the separator 20 and of the dust separator mechanism 31.

The deagglomeration drum is adapted to be part of the ball mill. In a preferred form, rotational movements of the deagglomeration drum easily break up the scabs of material. Lift elements may be provided within the drum for lifting the material. The drum can be designed and function similar to the drum referred to in pending U.S. patent application, Ser. No. 626,675, Wüstner et al, filed July 2, 1984.

Thus, it will be seen that there has been provided a two-stage grinder which uniquely meets the objectives and advantages hereinabove set forth and effects an improved grinding and a saving in energy requirements.

I claim as my invention:

1. A method for comminution and grinding of brittle grinding stock comprising the steps:
   pressing material to be comminuted by a roll press;
   deagglomerating the output of the roll press in a deagglomeration chamber having only the material to be comminuted;
   separating the material from the deagglomeration chamber in a first cyclone separator into fine and coarse fractions; and
   grinding the coarse fraction in a tube mill.

2. The method for comminution and grinding of brittle grinding stock comprising the steps:
   pressing material to be comminuted by a roll press;
   deagglomerating the output of the roll press in a deagglomeration chamber;
   separating the material from the deagglomeration chamber in a first cyclone separator into fine and coarse fractions;
   grinding the coarse fraction in a tube mill;
   carrying finer material from the deagglomeration chamber to the separator by an airstream that first passes through the tube mill; and
   carrying coarse material by a separate coarse material moving means to the separator.

3. The method for comminution and grinding of brittle grinding stock in accordance with the steps of claim 1 and including:
   passing coarse material from the first cyclone separator to a second cyclone separator and
   returning materials from the second cyclone separator back to the tube mill.

4. A mechanism for the comminution and grinding of brittle grinding stock, comprising in combination:
   a tube mill including grinding bodies for reducing an average particle size of the grinding stock;
   a deagglomeration drum co-movable with the tube mill and connected at an outlet of said tube mill, said deagglomeration drum being free of grinding bodies;
   a roll press for receiving material to be comminuted and having a discharge connected to an inlet of the deagglomeration drum;
   and a separator connected to receive materials from an outlet of the deagglomeration drum and connected to deliver coarse materials to the tube mill.

5. A mechanism for the comminution and grinding of brittle grinding stock constructed in accordance with the claim 4 wherein:
   said deagglomeration drum and tube mill are constructed of a single rotary tube having first and second chambers in communication with one another, said tube having first and second opposite end faces and the roll press discharging through the first end face into the first chamber, said first chamber being said deagglomeration drum.

6. A mechanism for the comminution and grinding of brittle grinding stock constructed in accordance with claim 4 wherein:
   an out fall housing is provided connected to the outlet of the deagglomeration drum and to the outlet of the tube mill to collect material discharged therefrom.

7. A mechanism for the comminution and grinding of brittle grinding stock constructed in accordance with the claim 6 and including:
   a means for delivering an airstream to the tube mill;
   the out fall housing having openings for the passage of deagglomerated material from the drum and ground product from the tube mill.

8. A mechanism for the comminution and grinding of brittle grinding stock constructed in accordance with claim 6 wherein:

said out fall housing has an upper region and is provided with a conduit at said upper region for carrying materials to the separator.

9. A mechanism for the comminution and grinding of brittle grinding stock contructed in accordance with claim 6 wherein:
said out fall housing has an outlet for coarse materials and a bucket elevator is connected to said out fall housing outlet leading to said separator.

10. A mechanism for the comminution and grinding of brittle grinding stock constructed in accordance with claim 6 and including:
a second separator connected to receive coarse materials from said first separator with the second separator connected to discharge to the tube mill and a bucket elevator connected to receive coarse materials from said out fall housing and delivering said coarse materials to said second separator.

11. A mechanism for the comminution and grinding of brittle grinding stock comprising in combination:
a roll press for receiving materials to be comminuted and being operable to press said brittle grinding stock to cause fracturing thereof;
a deagglomeration chamber connected to receive material from the roll press and being operable to breakup said fractured grinding stock, said deagglomeration chamber being free of grinding bodies;
a separator connected to receive materials from said deagglomeration chamber and to separate fine materials from coarse materials;
and a tube mill connected to receive coarse material from the separator chamber and being operable to reduce the course material by grinding, said tube mill including grinding bodies.

12. A mechanism for the comminution and grinding of brittle grinding stock constructed in accordance with claim 11 and including:
a second separator connected to receive materials from the first separator and discharging to the tube mill.

13. A mechanism for the comminution and grinding of brittle grinding stock constructed in accordance with claim 11 and including:
means connecting a discharge of the tube mill to the deagglomeration chamber for delivering fine material;
and means for providing an airstream to the tube mill for aiding in materials passing from the tube mill to the deagglomeration chamber and to said separator.

14. A mechanism for the comminution and grinding of brittle grinding stock constructed in accordance with claim 11 and including:
means communicating between the tube mill and the deagglomeration chamber whereby fine material passes from the tube mill back to the deagglomeration chamber;
and a housing connected to receive materials from an outlet of the deagglomeration chamber.

15. A mechanism for the comminution and grinding of brittle grinding stock constructed in accordance with claim 11 wherein:
a discharge from the deagglomeration chamber and a discharge from the tube mill pass to a common conduit for conveyance to the separator.

* * * * *